Nov. 4, 1924.
1,514,548
E. LIONNE
POROUS IMPREGNATED FABRIC
Filed Sept. 10, 1921
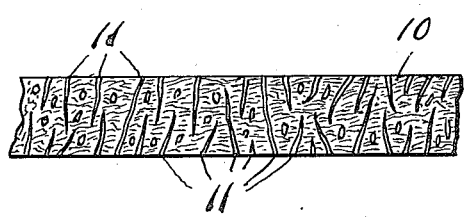
Inventor.
Ernst Lionne
by
[signature]
atty Patented Nov. 4, 1924.

1,514,548

UNITED STATES PATENT OFFICE.

ERNEST LIONNE, OF NEEDHAM HEIGHTS, MASSACHUSETTS.

POROUS IMPREGNATED FABRIC.

Application filed September 10, 1921. Serial No. 499,821.

*To all whom it may concern:*

Be it known that I, ERNEST LIONNE, a citizen of the Republic of France, residing at Needham Heights, in the county of Norfolk and State of Massachusetts, have invented an Improvement in Porous Impregnated Fabrics, of which the following is a specification.

This invention relates to, and has for its object a novel fabric including a colloidal material which is porous, or has passages or open spaces therein, and is fluid permeable; and which may admit of treatment to become soft and pliable and may subsequently become more rigid and unyielding than in its original state.

For certain purposes it is desirable to provide a material containing a colloidal substance, preferably one which is insoluble in water, which material may be softened in a relatively short time, as practically instantly, by immersion in a softening agent, and rendered pliable and capable of being easily bent into a desired shape and which, when dried in shape will be substantially stiffer than originally and will retain its shape and be thereafter less readily rendered pliable. Such a material is desirable in the manufacture of box toes for shoes, for instance.

For other purposes, it is desirable to provide a material which is resilient, tough, preferably insoluble in water, and which has a multitude of channels, apertures or passages therein communicating with the surface and which may, if desired, be filled with a substance having characteristics which differ from that of the material.

A fabric embodying my invention may comprise a fabric body which may or may not have a nappy surface. The fabric body is impregnated with a colloidal material, as a cellulose nitrate, with or without the addition of other colloids, as gums, resins and the like. The colloidal material permeates the entire fabric body and is present therein in a filmy coherent state, as contrasted with a granular or precipitated state. The fabric, including the fabric body and the coherent colloid impregnating material has pores, passages or spaces therein which render it porous.

The fabric body may be any suitable woven material as cloth; duct for example, or structureless material; felt, for example; and it may be thick or thin, as may be to meet specific requirements. The colloidal material may be a cellulose nitrate, or a gun, or a resin, or casein, and the like, or combinations of various colloidal materials. Preferably, however, I employ a cellulose nitrate as the main colloidal material.

The fabric of my invention may be made in various ways, as, for instance, the method disclosed in my co-pending application, Serial No. 490,405, filed August 6, 1921.

I will describe the method of making my novel material when a felt is employed as the fabric body, and a cellulose nitrate is employed as the impregnating colloidal material, but the method will be substantially the same for other fabric bodies and other colloidal materials.

In the above-named co-pending application, a sheet of felt is impregated with cellulose nitrate by immersing it in a solution of cellulose nitrate in a volatile solvent for a sufficient period of time to ensure thorough saturation of the felt. The wet impregnated felt is then introduced into a drying chamber which is heated to a temperature approximately equal to or greater than the boiling temperature of the solvent for the cellulose nitrate so that the solvent, in effect, boils away. The atmosphere surrounding the felt, preferably, is maintained substantially saturated with solvent vapor. By reason of the elevated temperature in the drying chamber approximately at, or above, the boiling point of the solvent, the drying action is rapid, much more rapid than is the practice in the manufacture of artificial leathers, wherein the drying temperature in the vicinity of the wet material is maintained as low as practicable. Due to the rapid drying action, the solvent practically boils out of the solution in the felt, and as the cellulosic material hardens, or assumes a coherent filmy and horny form in and on the fibres of the felt, holes or pores are formed in the material by the bubbles or solvent vapor as they are liberated from the cellulosic material. Due to the substantially saturated atmosphere of solvent vapor surrounding the drying felt, the drying action takes place substantially throughout the solution of cellulosic material, and not mainly at the surface thereof, as will be the case if the drying atmosphere contained but a small proportion of solvent vapor; consequently the pores or holes in the drying cellulosic material are kept open and the material finally becomes dry and contains a plurality of holes or pores which may extend from the surface of the material into the interior thereof, or are separated from the surface and from each other, or from the fibres of the felt by very thin films of the cellulosic material, which films may be broken down or penetrated practically instantaneously by the action of a softening agent.

The material thus formed is porous, and fluid permeable. The cellulosic material adheres tenaciously to the surface of the fibres of the felt and binds adjacent fibres together and is present in the felt as a coherent filmy material, and the prepared material has increased stiffness and resiliency. The prepared material may be rendered soft and pliable by immersing it for a few seconds in a softening agent, as, due to its porous structure, the softening agent readily permeates the material. In its pliable state it may be flexed into any desired shape and, when dry, becomes permanently set into such shape and has increased stiffness and resiliency. The pores of the material will be found to be mainly closed and the fibres of the felt united by or contained in a solid, imperforate filmy body as contrasted with its initial porous state.

A second method of making the material embodying my invention consists in impregnating the fabric body, as felt, with a colloidal material in solution, as a cellulose nitrate, and then drying the wet material at a suitable temperature which may be below the boiling point of the solvent in the cellulosic solution, and also in an atmosphere which may be low in solvent vapors. The dry cellulosic material will now be substantially free from pores or holes and the treated material will be fluid impermeable. The material may now be perforated mechanically by passing it between rollers, the surfaces of which are formed with a plurality of projections, or by any other suitable manner, whereby the material is formed with a plurality of closely spaced passages or holes or pores by which a softening agent may have access to the interior of the fabric to render it soft and pliable in a relatively short period of time.

A third method of making the porous, colloid impregnated material embodying my invention may be to proceed as follows:

The felt is first immersed in a solution containing a crystalline substance, preferably, soluble in water, as sodium chloride; and the felt is impregnated with the solution. When the felt is thoroughly impregnated with the solution, or impregnated sufficiently for a specific purpose, it is removed from the solution and dried in any suitable manner and apparatus. As the solvent evaporates from the felt, the crystalline substance is precipitated and collects in and between and on the fibres of the felt and adheres to the fibres. The felt is next immersed in a solution containing a colloid, as a cellulosic nitrate, and is impregnated with the colloidal substance. The felt is then removed from the colloidal solution and the colloidal substance covers the crystals previously deposited between and on the fibres of the felt. The impregnated felt is now dried in any suitable manner and the solvent is evaporated from the fluid colloidal substance to leave a filmy, solidified, coherent mass which permeates the entire body of the felt and is adherently united to and covers the fibres of the felt; and covers the crystals carried by the felt.

The dry colloid-impregnated felt is then immersed in a bath of solvent for the crystals, which in the case of sodium chloride crystals, may be water. The water acts to dissolve the crystals, by direct contact with some crystals, and by osmosis through the fibres of the felt and through the colloidal material to dissolve other crystals. The length of time the felt is in the crystal-solvent bath will vary but preferably the solvent action should continue until a sufficient amount of crystals have been dissolved to render the final product suitably porous.

The felt is then removed from the solvent solution and dried in any suitable manner and the dried felt will contain a multitude of pores or spaces in its colloidal impregnating material which previously were occupied by crystals.

The product is fluid permeable and may be softened rapidly by immersion in a softening agent for the colloidal material. After immersion and subsequent re-drying the pores of the colloidal material will be substantially destroyed and the colloidal material will become impervious and can again be softened but with difficulty.

Fabrics have been previously treated with colloidal substances but either the fabric has been impervious and rendered flexible or pliable only with difficulty; or the colloidal material has not been present in the fabric body in its natural, filmy and hardened coherent state but in a granular or precipitated state, in which state it is but mechanically retained in the spaces between the fibres of the fabric and does not cover and adhere to the fibres and bind adjacent fibres together as is the case with the fabric with which this invention is concerned.

The figure illustrates an enlarged sectional detail of the porous impregnated fabric embodying the invention wherein 10 represents the porous fibrous fabric and 11 the pores or channels that are formed therein by the above described rapid drying action.

I claim:

1. A new article of manufacture comprising a fibrous porous body having a soluble colloid in a filmy and coherent state contained between and on and adherently united with the fibres of said body while substantially preserving the porosity of said fibrous porous body.

2. A new article of manufacture comprising a fibrous porous body having a nitrocellulose in a filmy and coherent state contained between and on and adherently united with the fibres of said body while substantially preserving the porosity of said fibrous porous body.

3. A new article of manufacture comprising a fibrous porous body impregnated with a soluble colloid in a filmy and coherent state which is between and on and adherently united with the fibres of said porous body, said colloid having pores therein separated by films of the colloid.

4. As a new article of manufacture, a fabric having a colloidal substance contained in and adherently united with the fabric and which is in the fabric in a filmy coherent porous state.

5. A new article of manufacture comprising a fibrous porous body having a water-impervious yet readily soluble colloid in a filmy and coherent state contained between and on and adherently united with the fibres of said body while substantially preserving the porosity of said fibrous porous body.

In testimony whereof, I have signed my name to this specification.

ERNEST LIONNE.